Aug. 4, 1931.  F. W. GAY  1,816,838
PROTECTIVE SYSTEM
Filed Oct. 2, 1929  2 Sheets-Sheet 1
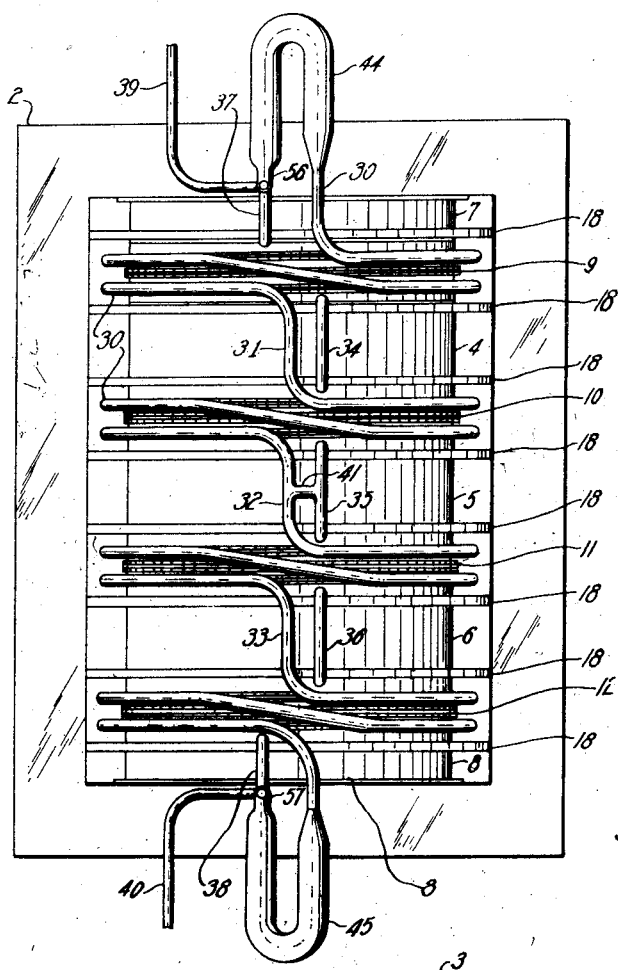
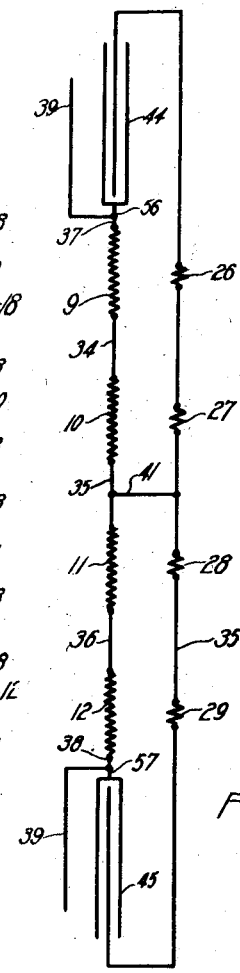
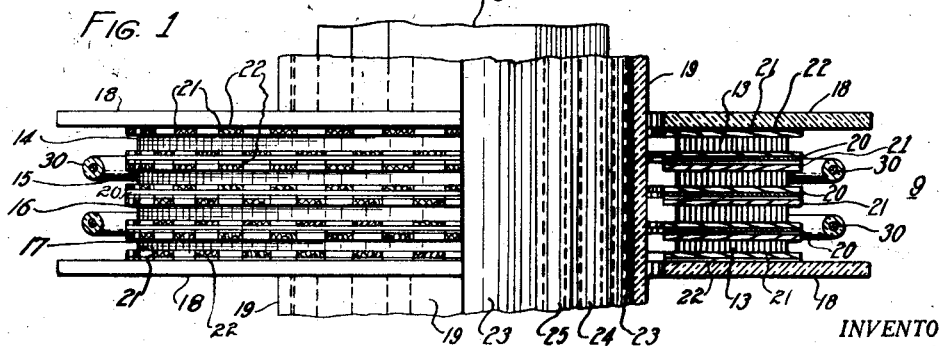
INVENTOR.
Frazer W. Gay.
BY George D. Richards
ATTORNEYS.

Aug. 4, 1931.  F. W. GAY  1,816,838
PROTECTIVE SYSTEM
Filed Oct. 2, 1929   2 Sheets-Sheet 2
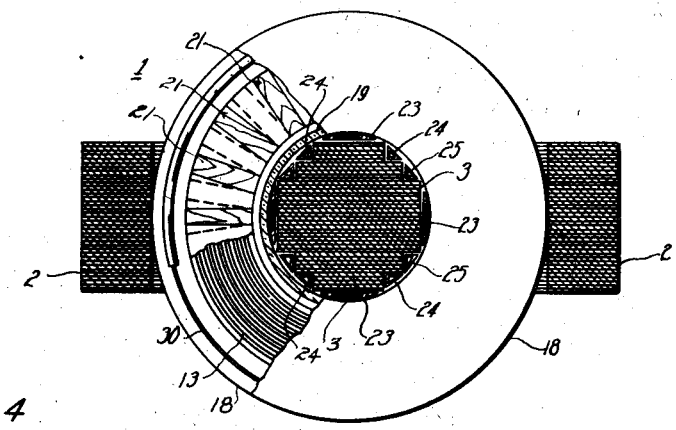
Fig. 4
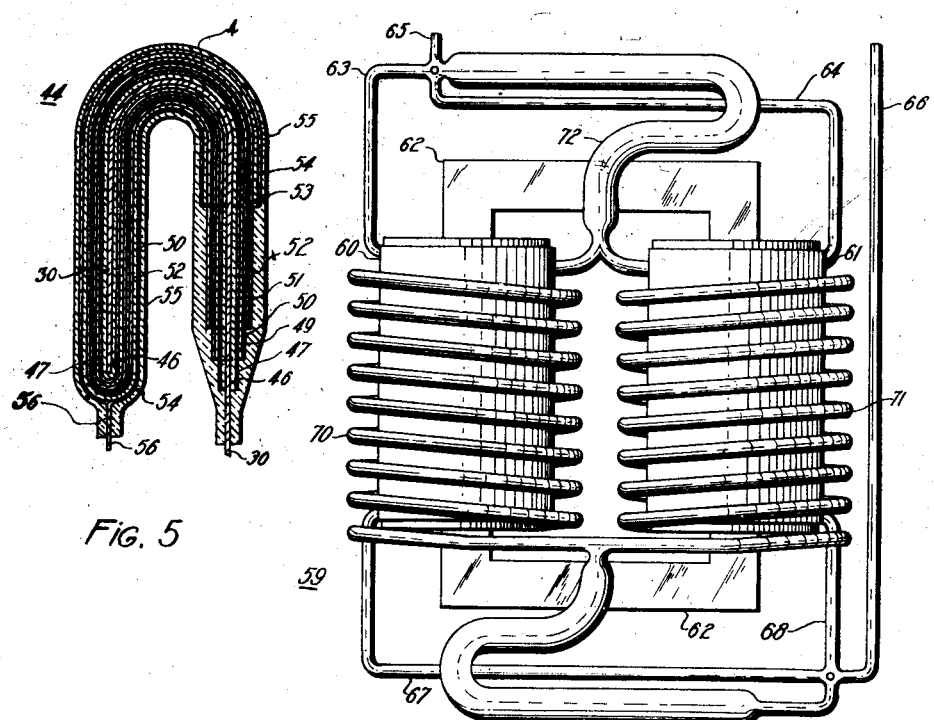
Fig. 5
Fig. 6
INVENTOR.
Frazer W Gay
BY
ATTORNEYS.

Patented Aug. 4, 1931

1,816,838

UNITED STATES PATENT OFFICE

FRAZER W. GAY, OF NEWARK, NEW JERSEY

PROTECTIVE SYSTEM

Application filed October 2, 1929. Serial No. 396,658.

This invention relates, generally, to means for protecting electrical machinery from abnormally high voltage surges such as those produced by switching surges or by lightning; and the invention has reference, more particularly, to a novel protective system for preventing injury to, or the discontinued operation of, transformers, reactors and the like subject to such voltage surges.

The short circuiting and burning out of windings in transformers, reactors and similar apparatus is generally caused by an insulation break down between turns or layers and such break downs usually occur in the end portions of the windings.

Recent investigations with the cathode ray oscillograph disclose that the high voltage winding of a power transformer offers an enormous impedance to the passage of a current surge and that such a surge while passing through the winding successively subjects consecutive individual turns and layers to enormous electrical stresses. Engineers have shown that if this surge can be quickly and uniformly distributed among the various turns and layers of the winding so that the entire insulation of the transformer shares the burden, then no part of the insulation between turns or layers will at any time be excessively stressed.

It has been demonstrated that such a uniform distribution of potential stress can be obtained by building special capacitances and carefully balancing the same with the capacities inherent in the transformer so as to thereby provide a capacity path for the surge current which path will have a uniform impedance. The construction and installation of such capacitances requires very careful calculation to obtain the proper balance and very expensive and extensive tests to make sure that the desired results have been attained.

In my application filed October 8, 1928, Serial Number 311,112, matured into Patent No. 1,809,895, June 16, 1931, there is disclosed a protective system providing a resistance path that offers relatively low impedance to high frequency surge currents, which system is relatively cheap and easy to design and place in a transformer as compared with other systems.

The present invention has for its principal object to provide a novel protective system for transformers, reactors and the like which employs a surge winding having a low impedance to surges, said surge winding acting by magnetic induction to uniformly and substantially instantaneously induce voltages in the turns of the protected winding or device of such value that the sum of such induced voltage is substantially equal to the surge voltage impressed upon the winding or windings of the device protected. If the induced voltage is greater than the voltage impressed upon the device protected, then a small surge current will flow in the protected winding of sufficient magnitude to absorb the over-voltage induced in the winding.

On the other hand, if the voltage induced in the protected winding is less than the surge voltage impressed across the device, then the difference in voltage is borne by the end winding layers of the protected device. The protective system is ordinarily designed so that the induced voltage is equal to or greater than the surge voltage.

The invention has for another object to provide a system of the above character which is of even simpler and cheaper construction than that covered by my aforementioned application and which is exceptionally reliable in operation.

In carrying out the invention, the winding to be protected, such as a high voltage transformer winding of many turns is parallel with a high voltage surge winding of few turns, said surge winding preferably having a point thereof, such as its mid-point connected to a corresponding point of the protected winding of many turns.

The high voltage winding of many turns has its end terminals connected to high voltage bushing terminals as is customary, whereas the high voltage surge winding of few turns has its terminals connected to the said high voltage bushing terminals through capacitors or condensers having low impedance to surges but high impedance to currents of ordinary operating frequencies.

These two windings provide two current paths of different reactance characteristics. The winding of many turns offer a relatively low impedance to the flow of low frequency power currents therethrough owing to its essentially inductive characteristic, whereas the surge winding of few turns offers a very great impedance to such low frequency power currents owing to the presence of the capacitors or condensers included therein. The action of these windings is reversed with respect to high frequency surge or lightning currents. Thus the winding of many turns offers an enormous impedance to these high frequency currents, whereas the surge winding of few turns allows relatively heavy currents to flow at high frequencies, and these currents in flowing through the surge winding induce substantially equal voltages in equal portions of the protected winding of such value that the sum of such voltages is substantially equal to the surge voltage impressed upon the transformer, thereby uniformly distributing the surge voltage over the protected winding of many turns and causing this voltage to be borne substantially equally by all of the turn and layer insulation thereof.

Other objects of this invention, not at this time more particularly enumerated, will be clearly understood from the following detailed description of the same.

The invention is clearly illustrative in the accompanying drawings, in which:—

Fig. 1 is a schematic view of a shell-type transformer equipped with the novel protective system of this invention.

Fig. 2 is a wiring diagram of the transformer high tension winding and of the associated protective system.

Fig. 3 is an enlarged view with parts broken away of a portion of the structure of Fig. 1;

Fig. 4 is a plan view with parts broken away of the transformer of Fig. 1;

Fig. 5 is an enlarged sectional view of a capacitance employed in the protective system; and Fig. 6 is a schematic view of a core-type transformer equipped with the novel protective system of this invention.

Similar characters of reference are employed in all of the hereinabove described views, to indicate corresponding parts.

Referring now to Figs. 1 to 5 of the drawings, the reference character 1 indicates a shell type transformer having a core 2 with a low tension winding and a high tension winding mounted on the central core leg 3. The low tension winding is illustrated as consisting of three intermediate groups of coils 4, 5 and 6 and two end coils 7 and 8. The transformer high tension winding consists of four sections 9, 10, 11 and 12 that are interconnected by insulated leads 34, 35 and 36 and has terminal leads 37 and 38 connected to the transformer high tension terminals 39 and 40. As especially shown in Fig. 3 each of these sections comprises four coils designated 14, 15, 16 and 17 made up of spirally wound conductors 13. These high tension coil sections are insulated from the coils of the low tension winding by suitable built up insulation 18 and both of these windings are insulated from the central core leg 3 by similar built up insulation 19.

The sections 9 to 12 of the high tension winding are all of similar construction and therefore only one of these winding sections, namely section 9, will be described in detail. The coils 14 to 17 of this winding section are suitably spaced from one another by insulating rings 20 and circumferentially arranged spacer blocks 21, positioned on opposite sides of the insulating rings 20 and also between the top and bottom coils 14 and 17 and the insulation 18.

The spacer blocks 21 are spaced from one another and extend radially outwardly of the transformer as is especially shown in Fig. 4 and provide passages for the circulation of the cooling medium used in the transformer. This construction provides double rows of circumferentially arranged spacer blocks between consecutive coils and a single row of spacer blocks between the end coils 14 and 17 and the insulation 18. The spacer blocks of each double or single row are preferably staggered with respect to the spacer blocks of the next double or single row as illustrated in Fig. 3. The top and bottom rows of circumferentially arranged spacer blocks and one row of each of the double rows of intermediately arranged spacer blocks are covered by relatively thin sheets of non-magnetic material 22, such as copper. The use of the sheets 22, which are opaque to the passage of surge flux, substantially prevents the passage of surge flux through the windings of the transformers. The space intermediate the central core leg 3 and the insulation 19 is substantially filled while not impeding the flow of cooling fluid by the use of tubular members 23, 24 and 25 also of non-magnetic material. These tubular members permit the cooling medium to flow longitudinally through them while substantially preventing any surge flux from passing between the core leg 3 and the insulation 19.

The high tension winding is encompassed by a protective surge winding comprising a single insulated conductor 30 wound into four sections 26, 27, 28 and 29 surrounding the sections 9 to 12 respectively of the high tension winding. Each of the sections of the surge winding comprises two spaced turns and these sections are interconnected by vertically extending connector portions 31, 32, and 33. Connector portion 32 is shown as connected by an insulated jumper lead 41 to the lead 35 connecting the upper and lower halves of the high tension transformer winding. The end terminals of the surge winding are coupled by capacitors or condensers 44 and 45 to the transformer high tension terminals 39 and 40. Capacitors 44 and 45 are of similar construction and consequently only one of these members, namely capacitor 44 will be described in detail.

Capacitor 44 is shown in central vertical section in Fig. 5 and comprises essentially a plurality of spaced hollow cylindrical condenser plates with insulation therebetween. Conductor 30 of the surge winding extends centrally within the capacitor 44 and terminates near that end of this capacitor which is connected to the high tension terminal 39. A layer of insulation 46 surrounds conductor 30 and a cylindrical condenser plate 47 surrounds this insulation. That end of condenser plate 47 which is adjacent the end of conductor 30 is illustrated as closed while the other end of this condenser plate is open to receive the insulated conductor 30. A layer of built-up insulation 49 surrounds condenser plate 47. A second cylindrical condenser plate 50 surrounds insulation 49 and has its open end stepped back somewhat from the open end of condenser plate 47. Successive condenser plates 52 and 54 and intermediate layers of insulation 51 and 53 surround the condenser plate 50. Condenser plates 47, 50, 52 and 54 serve to uniformly distribute the electrical stress throughout the several insulating layers and it is to be understood that a greater or lesser number of these condenser plates than those shown in the drawings may be used in accordance with the requirements of any particular installation. The outermost condenser plate 54 is surrounded by insulation 55 and has its closed end connected by an insulated lead 56 to the transformer high tension terminal 39. Likewise the outermost condenser plate of capacitor 45 is connected by an insulated lead 57 to the transformer high tension terminal 40.

During the normal operation of the transformer 1, the surge winding will have substantially the same potential as that of the mid-point of the high voltage transformer winding owing to the presence of the jumper lead 41 which is illustrated as connecting these two windings together at their mid-points. The two capacitors or capacitances 44 and 45 will absorb or withstand very nearly 100 percent of the potential difference existing between the end terminals of the high tension transformer winding and its mid-tap, the surge winding itself absorbing but little of this potential difference so that normally there exists a potential drop between the ends of the transformer and the ends of the surge windings of substantially 99 percent of half the total voltage across the transformer high tension winding.

While the core 2 is very permeable to the passage of magnetic fluxes of normal working frequencies it is substantially opaque to the passage of magnetic fluxes of high frequency such as those produced by surges. In general, magnetic substances of commercial thickness decrease the reluctance of a magnetic path below that of air for frequencies of less than 25,000 cycles per second, whereas they increase the reluctance above that of air for higher frequencies and become substantially non-permeable for the very high frequencies obtaining during dangerous current surges.

Although the surge winding 26—29 of this invention has relatively few turns as compared with the number of turns of the high tension transformer winding 9—12, yet the surge winding is adapted to have induced therein a voltage of substantially the same order as that induced in the transformer winding by a uniform magnetizing force of surge frequency acting over the entire area included by the surge winding. This will be apparent when it is noted that the sectional area within the transformer winding 9—12 is largely closed to the passage of surge frequency flux owing to the presence of the magnetic core 3 and non-magnetic members 21, 23, 24 and 25, whereas a considerable quantity of such flux may pass within the relatively great sectional area of the surge winding 26—29 owing to the spacing of this winding from the transformer winding 9—12. Thus it is possible for the surge winding of few turns to be operated in multiple with a power winding having many times as many turns without any appreciable exchange of current between the two windings. To enable such parallel operation, it is merely necessary that the number of turns in each winding be approximately inversely proportional to the average magnetizable area included within its turns. In general it is neither necessary nor desirable to adhere closely to this proportion since wide variations therefrom may occur in practice without causing the exchange of currents of serious magnitude due to the surge impedance of the power winding.

In operation, if a surge wave of dangerous magnitude approaches the transformer 1 and reaches its peak in, for example, one quarter of a microsecond, condensers 44 and 45 will offer a very low surge impedance to such a wave and very nearly the entire voltage will be impressed on the surge winding sections 26—29. As is well known, the high voltage winding 9—12 of the transformer by having a large number of turns and layers acts practically as a collection of independent open circuited turns and layers during the first few microseconds after the arrival of the surge. The surge winding, however, has only sufficient turns to adapt it to almost instantly distribute the surge potential uniformly among its various turns. There will be an almost negligible time lag during which the end turns will be subjected to somewhat more than their share of the potential due to the inherent condenser coupling between turns. The voltage distribution over the surge winding, however, very rapidly reaches a fair uniformity while meanwhile inducing a similar uniform voltage distribution in the high tension transformer winding owing to the transformer arrangement of these windings. The sum of the voltages thusly induced in the protected transformer winding are hence equal to the surge voltage impressed upon the transformer and this voltage is borne substantially equally by all of the turn and layer insulation of the protected winding.

Preferably the conductor 30 of the surge winding is of relatively high resistance, so that when the rate of increase of current in the surge winding decreases, the current then flowing in the surge winding will produce an ohmic resistance drop of relatively great value tending to reduce the current to zero and largely damping out any tendency of the surge winding circuit to oscillate.

It is well known that a paper insulated cable is able to withstand surge voltages of many times the value of the low frequency voltage that such cable is designed to carry continuously. If, therefore, the surge winding consists of a cable insulated to carry continuously one-half of the normal transformer voltage, then it will be able to withstand surges of very high value and by properly adapting the impedance of the surge winding to that of the end capacitors 44 and 45, a transformer or other device so equipped may successfully withstand surge voltages of high value.

Fig. 6 shows the application of the invention to a core type transformer 59 having high voltage windings 60 and 61 that are wound over low tension coils (not shown) which in turn are mounted on the legs of core 62. The upper ends of windings 60 and 61 are connected in multiple by leads 63 and 64 respectively to the transformer high tension terminal 65. These windings have their lower ends connected in multiple to the other transformer high tension terminal 66 by leads 67 and 68.

The surge winding consists of two helices 70 and 71 of cable that are wound about the respective core legs of the core 62 and exteriorly of the high voltage windings 60 and 61. These helices are wound and joined in multiple and are connected to the high tension transformer terminals through capacitors 72 and 73 which are similar in construction to capacitors 44 and 45.

In operation, when a surge is impressed upon the transformer 59, the surge winding 70—71 acts to distribute the surge potential uniformly among its turns and by magnetic induction substantially uniformly among the turns of the high tension windings 60 and 61, thereby preventing injury to the latter.

Thus, it will be noted the protective system of this invention is of exceedingly simple construction and readily installed in connection with windings subject to surges.

In some instances the non-magnetic members 23, 24 and 25 may be omitted, especially when the transformer core substantially fills the space within its windings or when the surge winding may be spaced some distance from the transformer winding.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:—

1. In combination, an electrical device having a winding with a large number of turns offering a great impedance to high frequency currents and a protective system therefor, said protective system comprising condenser means and a surge winding of relatively few turns connected in series with said condenser means, and inductively associated with said winding of many turns, said condenser means and surge winding being connected in multiple with said winding of many turns and acting to offer a very great impedance to low frequency normal operating currents but a relatively low impedance to currents of high frequency, said surge winding serving to distribute high frequency potentials substantially uniformly throughout said winding of many turns.

2. In combination, a transformer having a high tension winding of relatively many turns and a protective system therefor, said protective system comprising a protective winding of relatively few turns magnetically coupled with said winding of many turns and capacitors connected in series relation with said protective winding, said protective winding and connected capacitors being connected in multiple with said transformer winding of many turns.

3. In an electrical apparatus, the combination with a winding, of a second winding in inductive relation to said first named winding, said second winding providing an inductance path for high frequency currents and acting by magnetic induction to supply voltage to said first named winding for maintaining a substantially uniform rate of increase of voltage in all portions of said first named winding.

4. In an electrical apparatus, the combination with a winding of many turns, of a second winding of few turns in inductive relation to said first named winding, condensive means in conductive relation with said second winding, said second winding and condensive means being connected in multiple with said first named winding so that said second winding substantially uniformly distributes surge voltages impressed on said windings uniformly throughout said first named winding, whereby such voltages are borne substantially uniformly by all turns of said first named winding.

5. In an electrical apparatus, the combination with a core, of a winding of many turns having a multiplicity of sections on said core, and a surge winding of few turns having a similar number of sections, the consecutive sections of said surge winding being inductively related to respective sections of said winding of many turns and having numbers of turns that are proportional to the numbers of turns of the corresponding sections of said winding of many turns.

6. In an electrical apparatus, the combination with a core, of a winding of many turns having a multiplicity of sections on said core, a surge winding of few turns having sections corresponding to and in surrounding inductive relation to the sections of said winding of many turns, capacitors connected in series with the ends of said surge winding, said capacitors and surge winding being connected in multiple with said winding of many turns, and conductive means electrically connecting said windings, said conductive means causing each of said capacitors to absorb substantially one half of the normal operating voltage of said winding of many turns.

7. In an electrical apparatus, the combination with a winding, of a second winding in inductive relation with said first named winding and acting by magnetic induction to supply surge voltage to said first named winding for maintaining a substantially uniform rate of increase of voltage in all portions of said first named winding, and means within the confines of said first named winding for reducing the area normally permeable to surge frequency flux.

8. In an electrical apparatus, the combination with a winding, of a second winding in inductive relation with said first named winding and acting by magnetic induction to supply surge voltage to said first named winding for maintaining a substantially uniform rate of increase of voltage in all portions of said first named winding, and current conductive elements positioned between consecutive portions of said first named winding for decreasing the relative magnitude of such area permeable to surge frequency flux with respect to the area permeable to surge frequency flux enclosed by said second named winding.

In testimony, that I claim the invention set forth above I have hereunto set my hand this 28th day of September, 1929.

FRAZER W. GAY.